United States Patent Office 3,311,676
Patented Mar. 28, 1967

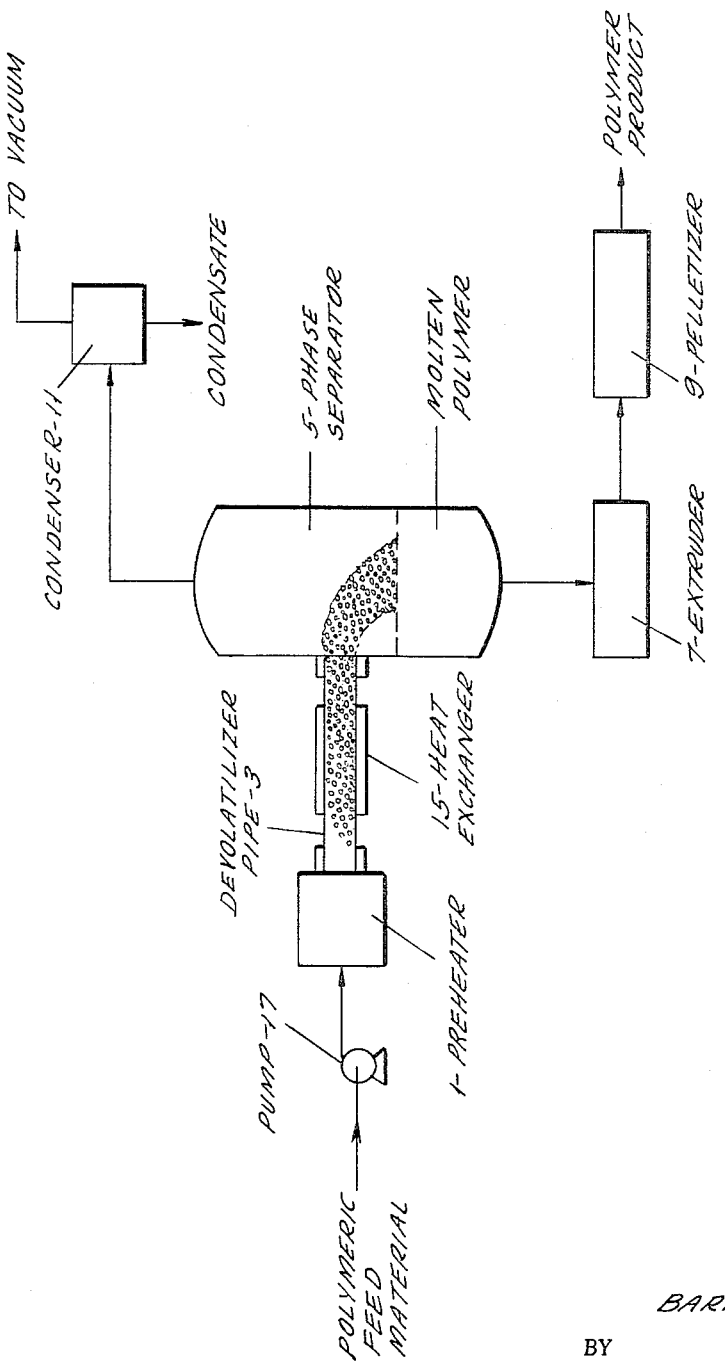

3,311,676
DEVOLATILIZATION PROCESS
Barna Toekes, Oakland, N.J., assignor to Rexall Drug and Chemical Company, Los Angeles, Calif., a corporation of Delaware
Filed Aug. 8, 1963, Ser. No. 300,832
6 Claims. (Cl. 260—880)

The present invention relates to a new and improved process for removal of volatile constituents from polymeric materials. More particularly, the invention pertains to a new and improved process for the devolatilization of rubber-modified polystyrenes.

In the preparation of many of the commercially available polymers, it is customary to employ various solvents and other agents in order to achieve certain results in the operating conditions and in the characteristics of the polymer product. When such materials are employed, one of the necessary polymer recovery steps involves the devolatilization of, or evaporation of impurities from the polymer product generally while it is still in molten or liquid form. For many commercial applications, the devolatilization step is required for the production of polymers which are substantially free of volatile constituents or where such impurities are reduced below contaminating levels. This requirement is especially important where the polymer product may be ultimately employed in conjunction with foods, for example, as packaging containers and the like.

A number of special methods and apparatus have been heretofore proposed in order to accomplish the removal of volatile or fugacious constituents from various polymeric materials. The special equipment has the disadvantage of being quite costly and difficult to maintain in condition to produce a purified polymer product substantially free of volatiles and other contaminants. Some of the prior art processes have been found troublesome insofar as they call for elaborate treating steps, while others require extended treating periods in order to effect devolatilization. In addition, it has also been found too difficult to attain substantially complete devolatilization of the polymeric materials without decomposing or degrading the polymer by utilizing the prior art methods. The latter problem has caused difficulties in that a polymer product having more than a minimum volatiles content does not comply with certain govermental specifications.

One object of the present invention is to provide a new and improved process for removing volatile impurities from polymeric materials such as polystyrene and polyalphaolefins such as polyethylene and polypropylene.

Another object of the present invention is to provide a devolatilization process for polymeric materials which avoids the difficulties encountered in the prior art processes.

Still another object of the present invention is to provide a devolatilization process which will effect relatively rapid devolatilization of the polymeric materials while yielding a polymer product having a minimum of volatile content.

A further object of the present invention is to provide a new and improved process for removal of volatile constituents from rubber-modified polystyrenes, acrylonitrile-butadiene-styrene terpolymers, or the foregoing containing methyl methacrylate and the like.

These and other objects of the invention will become readily apparent from the ensuing description and illustrative embodiments.

In accordance with the present invention, it has now been found that devolatilization may be effectively accomplished by continuously passing molten or liquid polymeric materials, generally after a preheating step, through a confined zone into a phase separation zone which is in open communication with the confined zone or passageway. Devolatilization is accomplished by subjecting the molten polymeric material to elevated temperatures and vacuum conditions as it passes through the confined zone at relatively high velocities into the phase separation zone. By practicing the inventive process as aforedescribed, it has been found that highly efficient devolatilization occurs in the confined or passage zone. In addition, very rapid devolatilization was accomplished and a polystyrene polymer product was recovered, for example, which contained a substantially reduced volatile content which was found to be lower than those of commercially available polystyrene products. The polymer product was also found to be exceptionally homogeneous with uniform melt flow characteristics.

In carrying out the devolatilization during passage through the confined zone, it was found that foaming resulted from the rapid escape of the volatile constituents from the molten polymer obtained from the polymerization zone or zones. This foaming appears to facilitate devolatilization as well as promoting the production of a homogeneous polymer product. The elevated temperatures employed during the devolatilization also appear to be highly advantageous insofar as it is believed that increased conversion takes place without decomposition of the polymer which might occur if such temperatures were employed for more prolonged periods such as during the polymerization step. It was further found that the process of this invention requires less time to achieve the desired degree of devolatilization as compared to the prior art methods, and when this is considered is conjunction with the high order of devolatilization attained, several of the most important advantages of the present invention become obvious.

In general, the process of this invention is carried out by feeding molten polymeric materials continuously into the inlet side of this confined foaming or passage zone. The feed material, containing undesirable volatile constituents, is at a temperature at least above the softening point of the polymer. For polymers such as rubber-modified polystyrenes, which will be described as the preferred polymeric materials of this invention, the initial temperature will be about 160° to 260° C., and preferably about 200° to 240° C. The polymeric feed material, obtained either directly from the polymerization zone or from hold tanks, is heated to these temperatures in a heat exchanger (preheater) just prior to being fed into the confined foaming zone. Conventional heat exchange equipment can be employed for this purpose.

The polymeric feed is next passed into the confined foaming zone at a velocity of about 0.1 to 15 feet per minute, depending on the temperature, pressure conditions used and volatiles concentration, and preferably at about 0.2 to 5 feet per minute. A vacuum of below atmospheric pressure, such as about 5 to 200, preferably about 15 to 50 mm. of Hg absolute is applied at the exit end of the foaming zone, and the temperature of the polymeric feed material is maintained above the softening point to prevent heat losses while effecting volatilization. It is also possible to employ higher temperatures in the foaming zone. For example, when the feed material contains high solvent concentration, heat losses due to the heat of vaporization may result in undesirable cooling of the polymeric mass. Another important operating condition in the foaming step is the hold up time of the polymeric material in the preheating and confined zones as it moves into the phase separation zone. The period of time required to effect preheating and devolatilization will generally range from about 2 to 100 minutes with a preferred overall treating time being about 5 to 30 minutes. It will be understood, however, that the efficiency of the preheating zone and the size of the confined zone will, in some instances, determine the residence time period. In general, the confined zone will be circular in cross-section, and for most purposes, may be an ordinary stainless steel or cast iron pipe or cluster of pipes provided with a heat exchange jacket. The diameter of the confined zones can be convergent or divergent depending on whether it is desired to increase or decrease the flow velocity of the polymeric material according to the process herein. Since foaming starts in the confined zone due to the reduced pressure applied, the design of the zone, that is, a convergent diameter type should be so arranged as not to substantially impair this important feature of the devolatilization process of this invention.

As previously noted, the confined foaming zone is in open communication with the phase separation zone where the molten polymer phase is separated from the gaseous volatiles phase. The phase separation zone may be in the form of a closed tank, as hereinafter described in more detail, with a molten polymer outlet at its base and gas removal means located in the upper portion. In view of the open communication which exists between the devolatilization zone and the phase separation zone, it will be understood that the exit end of the former is under the same vacuum conditions which are employed during phase separation. In actual operations, devolatilized polymer product is continuously removed from the phase separation zone, and it is not necessary to supply any heat at this point other than to make up any heat losses to the atmosphere to maintain the polymer in a molten state and to prevent condensation of volatile components in the phase separation vessel. The purified polymer product recovered from the phase separation zone can then be treated by conventional procedures such as extrusion and pelletization to produce the polymer in commercial form.

As previously noted, the process of this invention may be utilized with a variety of polymeric materials such as rubber-modified polystyrenes, acrylonitrile-butadiene-styrene terpolymers, acrylonitrile and styrene copolymers, and the foregoing wherein a portion or all of one of the monomers is replaced with alpha methyl styrene and/or methyl methacrylate and the like require devolatilization. Reference, however, will be made to rubber-modified polystyrene or related vinyl aromatic polymers, and for purposes of convenience, the invention will be described in detail and illustrated below in terms of this specific feed material. It will be understood that the devolatilization process has broader application and may be effectively employed for devolatilizing any of the aforementioned materials and the like.

In a recently proposed process, it has been found that rubber-modified polystyrene can be achieved, together with advantages in the control of the polymerization and in the control, uniformity and quality of the resin product obtained, by carrying out the polymerization under certain operating conditions and using a limted amount of an inert alkyl aromatic hydrocarbon diluent in the reaction mixture. The inert diluent being preferably present in one embodiment of this process from the initiation of the polymerization and at all times thereafter until the end of the reaction. It has been found that an alkyl aromatic diluent having, preferably, one alkyl group containing two carbon atoms or more which is liquid at ambient temperatures is the most satisfactory type of inert diluent. Examples of diluents useful herein are ethylbenzene, diethylbenzene, methyl ethylbenzenes and xylenes, with ethylbenzene being especially preferred. Bulk polymerized products where the monomer is used in excess as the diluent are not excluded from the process of this invention, however. Reference will be made hereinafter to ethylbenzene as the preferred diluent in a bulk solvent type process.

The process can be briefly described as comprising the following major steps. The reaction ingredients, including ethylbenzene, styrene, rubbery materials and additives are mixed in one or more vessels where dissolution of the rubbery materials is accomplished. Subsequently, the mixture is heated and polymerization (also referred to as the "prepolymerization") is carried to a certain point by catalytic or thermal initiation. In the second process step, polymerization may be carried out substantially to completion. The mixture of the polymerized material and diluent (ethylbenzene) is subjected to conditions in subsequent process steps where the diluent and any unreacted or volatile components are removed. Finally, the devolatilized polymer melt is extruded or converted to its final physical forms by any other means.

While the basic process steps have been described above, it should be understood that such process steps can be carried out continuously or in batchwise fashion, or any of the above steps or combination of the above steps can be carried out continuously, while the remaining steps can be carried out in batchwise fashion.

The use of ethylbenzene as a diluent enables the process to be carried out with excellent control of reaction temperatures, ease of heat removal, ease in handling both prepolymer and final polymeric mixtures, so that products of excellent color and physical and chemical properties are obtained. The amount of the inert diluent to be employed ranges from 3 to 30 weight percent based on the total weight of the reaction mixture.

In carrying out the process, a polymerizable mixture of about 65 to 98 precent by weight of the vinyl aromatic component, from about 2 to 30 percent by weight of the rubbery material selected as the second component, excluding the diluent, and an amount of ethylbenzene which comprises from about 3 to 30 percent of the total weight of the polymerizable reaction mixture are mixed together to form a solution. The polymerizable mixture can also contain up to 5 percent of additives. Some or all of the additives to be utilized can then be added to this mixture. These can include chain regulators, initiators, lubricants, antioxidants or other stabilizers and any other materials which may be known in the art as useful in such polymerization reactions to improve the properties of the final product. Polymerization is initiated by heating the mixture with proper agitation to from 60° to 140° C., preferably in a separate vessel from that in which the polymerization is completed to higher levels. A conversion level of the monomer or monomers present to polymer of between about 10 to 45% occurs during this step.

The prepolymerized mixture is next passed to a second polymerizer in which the polymerization may be substantially completed. It is important to carry the polymerization to as near completion as possible, preferably to about 85 and up to about 100% conversions of the polymerizable materials added or present. If desired, further polymerization stages can also be employed.

The monovinyl aromatic compounds which can be employed in producing the rubber-modified polymers herein include monovinyl aromatic compounds having the vinyl radical, or the ethylenically unsaturated radical attached directly to a carbon atom of the aromatic nucleus. Styrene is the preferred monovinyl aromatic compound employed in this process. Examples of other compounds applicable herein which are alkyl and/or halogen derivatives of styrene are the methyl styrenes, ethyl styrenes, isopropyl styrenes, butyl styrenes, both mono and dialkyl forms, etc., the chloro- and dichlorostyrenes, as well as mono- and dibromostyrenes, and alkyl halostyrenes, or mixtures of these compounds with styrene or with each other.

A large variety of unvulcanized natural or synthetic rubbery materials can be used as the second polymerizable component in the polymerization process. The rubbery starting material can be crude natural rubber, crepe rubber, gutta-percha or synthetic rubbers, such as SBR type rubbers, which are rubbery copolymers of styrene and butadiene, which may have from 40 to 95% by weight of butadiene and from 60 to 5% of styrene and which can be emulsion or solution polymerized, the latter with stereo-specific catalysts to result in linear and/or block polymers of styrene and butadiene or isoprene, synthetic nitrile type rubbers containing from 65 to 82% by weight of butadiene and from 35 to 18% acrylonitrile, rubbery homopolymers of butadiene and of isoprene, such as linear polybutadiene having a cis-1,4 content ranging from about 30 to 98%, and including the non-linear types prepared in one instance by emulsion or solution polymerization techniques, and the rubbery polymers of isobutylene combined with butadiene of isoprene.

The foregoing rubbery materials usually have a molecular weight of about 15,000 and higher, and broadly particular rubbers may be incorporated into the reactant mixture in amounts from about 2 to 30 weight percent, based on the total weight of reaction mixture, excluding solvent, and more preferably the rubber component is used in amounts of from about 5 to 15 weight percent.

In accordance with the preferred method of carrying out the polymerization process, about 0.01 to 0.3 weight percent of a chain regulator is employed. The regulator may be tertiary dodecyl mercaptan or related aliphatic mercaptans having from about 6 to 24 carbon atoms per molecule. A lubricant such as paraffin wax or a mineral oil may also be used in amounts ranging from about 1.5 to 5 weight percent. Another useful additive is an antioxidant, about 0.2 to 2 weight percent, such as trisnonylphenylphosphite and butylated hydroxytoluene.

When the aforedescribed polymerization is carried out, the rubber-modified polystyrene product is devolatilized in accordance with the process of the present invention to yield highly desirable polystyrene product. The volatiles removed have been found to be the solvent or diluent, e.g., ethylbenzene, unreacted styrene, low molecular weight polymers such as dimers, etc. It is possible to recover the diluent and unreacted styrene and to recycle these valuable materials to the initial stages of the polymerization process, if desired.

As previously discussed, it is preferred to pass the polymer product obtained from the second polymerization step to a preheater prior to devolatilization to insure that the polymer is completely molten. It will be understood, however, that the polymeric material may be passed directly to the confined foaming zone provided it is at the requisite temperature, i.e., at least above the softening point of the polymer.

The invention will be better understood by reference to the single figure of the drawing, which is a diagrammatic flow sheet illustrating equipment which can be utilized in the devolatilization process. As indicated above, the devolatilization process of this invention will be illustrated in connection with the devolatilization of rubber-modified polystyrene prepared in the presence of ethylbenzene as the solvent or diluent.

Referring now to the figure, the rubber-modified polystyrene feed material containing undesirable volatile contaminants is fed to preheater 1 via pump 17. The feed material contained about 5 to 35% by weight volatile contaminants comprising a major proportion of ethylbenzene and a minor or smaller amount of unreacted styrene. The remainder of the volatile constituents were materials such as low molecular weight polymers such as dimers and low boiling fractions of the additives used. The polymeric feed material is in solution in molten form at a temperature which is at least 150° C. and generally about 160° to 200° C.

In preheater 1, generally provided with indirect heat exchange means and a heating medium such as oil, the contaminated feed material is heated to a temperature of at least above about 200° C., and preferably to about 200° to 240° C. The thus heated polymeric material is recovered and passed into devolatilization pipe 3 where it is maintained at an elevated temperature by indirect heat exchange with heat exchanger 15, which prevents heat losses to the atmosphere. A vacuum or reduced pressure of about 15 to 50 mm. Hg is applied at the exit end of the devolatilization pipe. The polymeric material is passed into pipe 3 at a velocity of about 0.2 to 5 feet per minute, and the velocity will increase somewhat along the pipe due to the increase in volume resulting from the vaporization of volatile material. The overall residence time period in the preheater and devolatilization zone is about 10 minutes. The temperature of the polymeric material at the exit end will often be decreased about 10 to 20° C. due to heat losses by the heat of vaporization of volatile materials.

As a result of the operating conditions employed in pipe 3, rapid devolatilization of the polymeric feed material occurs with the formation of a foam. The latter appears to be an important advantage of the invention, since the presence of the foam, consisting essentially of gas surrounded by thin polymer walls, readily permits diffusion of the volatile impurities from the polymer into the gas bubbles. In addition, the greatly increased volume of the polymer material being treated and confined in the devolatilization pipe results in a rapid increase in the flow velocity thereby causing vigorous mixing which facilitates and insures substantially complete devolatilization in a short period of time. This leads to the high degree of devolatilization and excellent properties, including homogeneity, of the final polymer products accomplished in carrying out the process of this invention. As discussed previously, the increased homogeneity of the polymer product was vastly superior to prior art polymers. In addition, it appears that in some instances desirable cross-linking of the graft polymer occurs during the devolatilization step of this invention.

The polymeric material in the form of a foam recovered at the exit end of pipe 3 is passed directly into the upper portion of phase separator 5, which is in open communication with pipe 3 and at which point the reduced pressure of about 5 to 100 mm. Hg is applied. The foam collapses in phase separator 5 and the polymeric material in the forms of a heavy flowing melt is collected in the bottom portion of the vessel. If desired, the phase separator can be provided with mechanical devices such as a dispersion plate or cone to promote collapse of the foam. In continuous operations, the devolatilized rubber-modified polystyrene is continuously removed from the bottom of phase separator 5 and passed into extruder 7. The long strands of rubber-modified polystyrene melt obtained from extruder 7 are cooled and passed into pelletizer 9 to obtain the polymer in the desirable commercial form. It will be understood that the extrusion and pelletizing steps are not essential features of the present invention, and if employed, conventional extrusion and pelletizing operations and equipment can be utilized.

Returning now to phase separator 5, the volatiles, in gaseous form, are collected in the upper portion as the polymeric foam collapses. The volatile gas phase is removed and condensed by passage through condenser 11. The condensed volatiles are recovered therefrom. The reduced pressure for the devolatilization system is drawn through the condenser or through the condensate collecting vessel by a vacuum pump (not shown).

The following table is set forth in order to further illustrate the efficiency of the devolatilization process of this invention. Using the equipment described above and a pipe having a diameter of 3 inches and a length of 24 inches, unless otherwise specified, a number of devolatilization runs were carried out under the conditions described above and the specific devolatilization conditions set forth below. It will be understood that these specific operating conditions are for purposes of illustration and not of limitation. The polymeric feed material was a rubber-modified polystyrene, the rubber being SBR and ethylbenzene being used as the solvent. The undesirable volatile constituents amounted to about 15% by weight.

Prior to being passed to the devolatilization zone, the polystyrene feed was preheated to a temperature of about 220° C.

TABLE

| Run No. | Rubber, Percent by wt. | Exit Pressure, mm. Hg. | Residence Time, min. | Izod Impact[1] | Volatiles in Product, Percent by wt. |
|---|---|---|---|---|---|
| 1 | 5 | 20 | 11 | 1.7 | 0.5 |
| 2[2] | 5 | 20 | 16 | 0.9 | 1.5 |
| 3 | 8 | 20 | 11 | 3.0 | 0.58 |

[1] ASTM D-256-56.
[2] Devolatilization pipe dimensions: 3 inches in diameter and 60 inches long. The pipe also had a sand packed filter positioned at its exit end.

The above data show the high degree of devolatilization which is attained by utilizing the process of this invention. In Runs No. 1 and 3, a highly homogeneous, rubber-modified polystyrene product was obtained with volatiles content far below objectionable levels. Analysis of volatiles revealed that the monomer and ethylbenzene were each reduced below 0.1%. The efficiency of the present devolatilization process is further revealed when it is noted that rubber-modified polystyrene products now sold commercially have a volatiles content of about 2.0 to 3.0 percent by weight utilizing the same analytical procedure.

For purposes of further comparison, Run 2 was carried out employing similar equipment with the exception that a sand packed filter was positioned at the exit end of pipe 3. The devolatilization zone was, therefore, not in open communication with phase separator vessel 5. This means that there was no reduced pressure in the devolatilization zone and consequently no foaming of the product in the confined zone. The polystyrene product was found to have a volatiles content of approximately 1.5% by weight. It was further found that other properties of the polymer product such as impact strength were inferior to the properties of the polystyrene product recovered from the more preferred devolatilization system of this invention.

The process of this invention has been found to consistently yield polymeric product containing less than 1% by weight volatile constituents of which styrene monomer comprises less than 0.1% by weight.

The superiority of the process of the present method for effecting devolatilization is readily apparent from the above data. Not only was the volatiles content reduced below objectionable levels, but the devolatilization was rapidly accomplished and did not require the substantial holdups employed in the prior art processes. The homogeneous nature of the polymer product and its excellent Izod impact strength values are additional advantages of some commercial importance.

While particular embodiments of the invention are shown above, it will be understood that the invention is obviously subject to variations and modifications without departing from its broader aspects. Thus, for example, polymeric materials contaminated with undesirable volatiles other than rubber-modified vinyl aroamtic polymers may be devolatilized by following the process of this invention.

What is claimed is:

1. A process for devolatilizing a molten polymeric material containing volatile contaminants which comprises heating said polymeric material to a temperature at least above the softening point of the polymeric material, feeding the heated material at a velocity of about 0.2 to 5 feet per minute through a confined foaming zone having a tubular shape and at a reduced pressure of less than 200 mm. Hg applied to the exit end of said foaming zone, whereby a foam is formed in said foaming zone containing bubbles of the volatiles removed from said polymeric material, passing the thus formed foam at this temperature into a phase separation zone which is in open communication with said foaming zone, separating a gas phase resulting from the collapse of said foam from a molten polymeric material phase, and recovering said devolatilized molten polymeric material from the bottom of said separation zone.

2. The process of claim 1 wherein said molten polymeric material is a vinyl aromatic polymer.

3. The process of claim 2 wherein said vinyl aromatic polymer is polystyrene.

4. The process of claim 3 wherein said polystyrene is rubber-modified.

5. The process of claim 1 wherein the pressure in the devolatilization zone and in the phase separation zone is within the range of about 5 to 200 mm. Hg.

6. The process of claim 1 wherein the initial temperature of the polymeric material fed to the devolatilization zone is within the range of about 200° to 240° C.

References Cited by the Examiner

UNITED STATES PATENTS 3,140,266  8/1964  Peticolas _____ 260—2.5
3,243,481  3/1966  Ruffing et al. _____ 260—880

MURRAY TILLMAN, *Primary Examiner.*

D. J. BRENZNER, *Assistant Examiner.*